Oct. 10, 1950     S. MISIC     2,525,421
FOOD MIXER
Filed Feb. 17, 1947     2 Sheets-Sheet 1
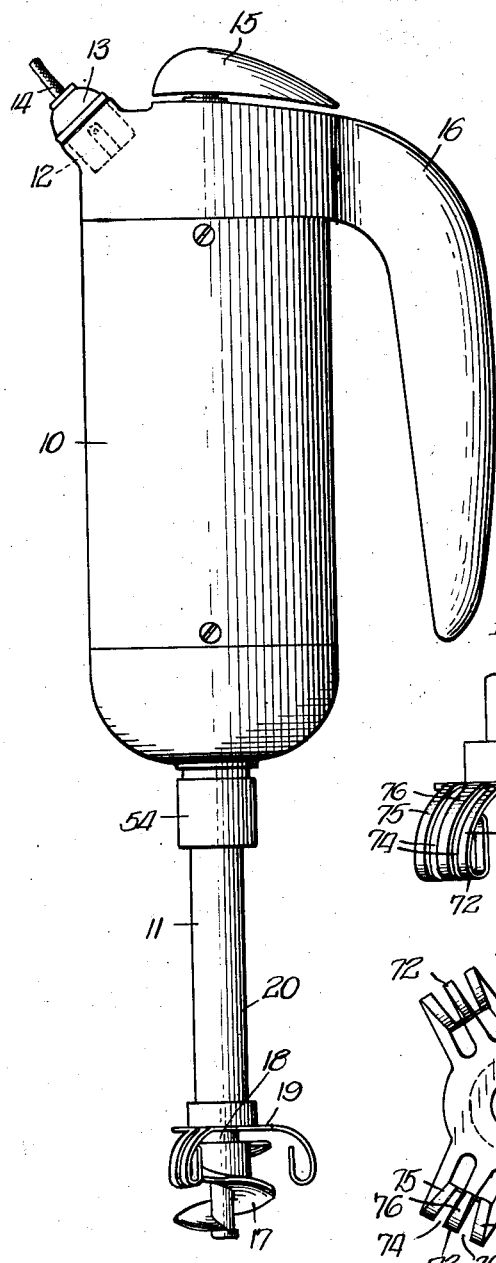
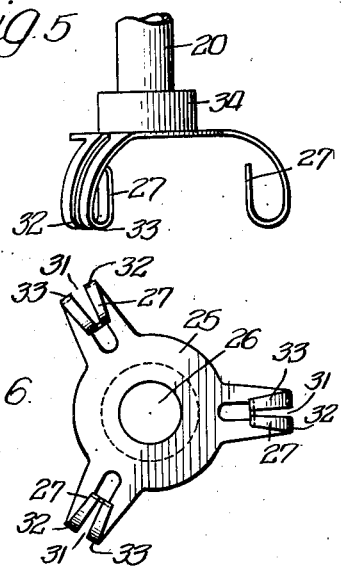
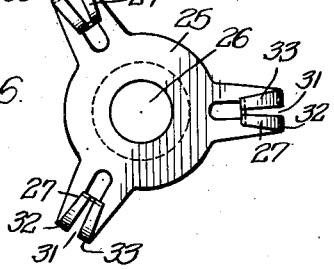
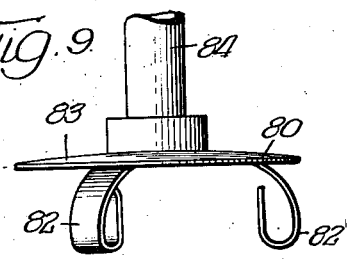
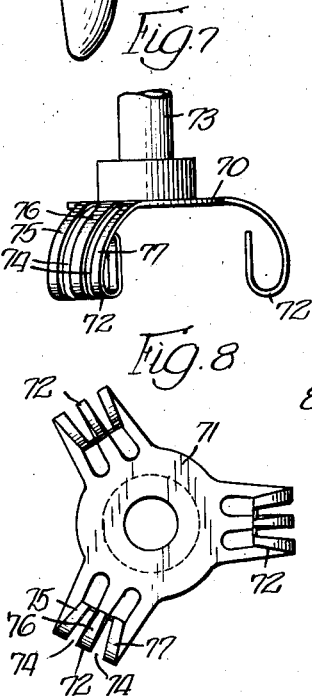
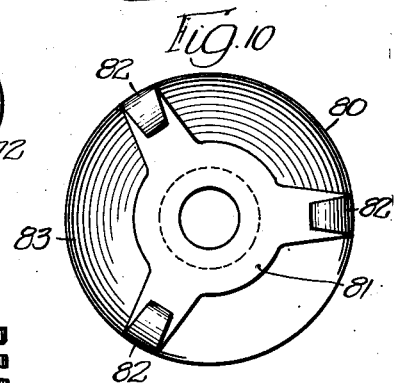
INVENTOR.
Stephen Misic.
BY
Cromwell, Greist & Warden
attys.

Oct. 10, 1950  S. MISIC  2,525,421
FOOD MIXER
Filed Feb. 17, 1947  2 Sheets-Sheet 2
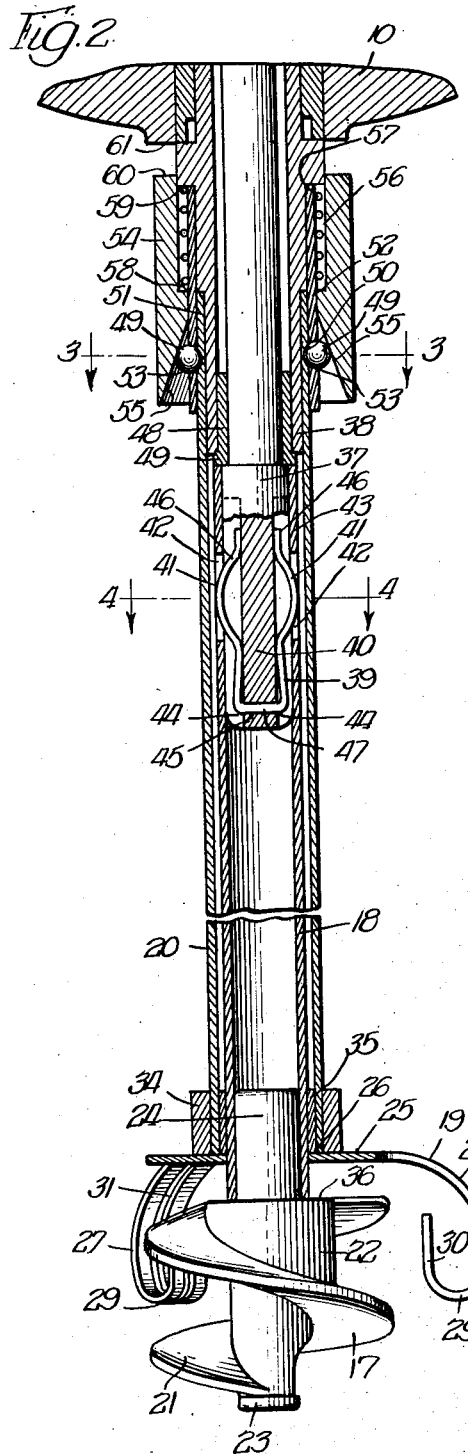
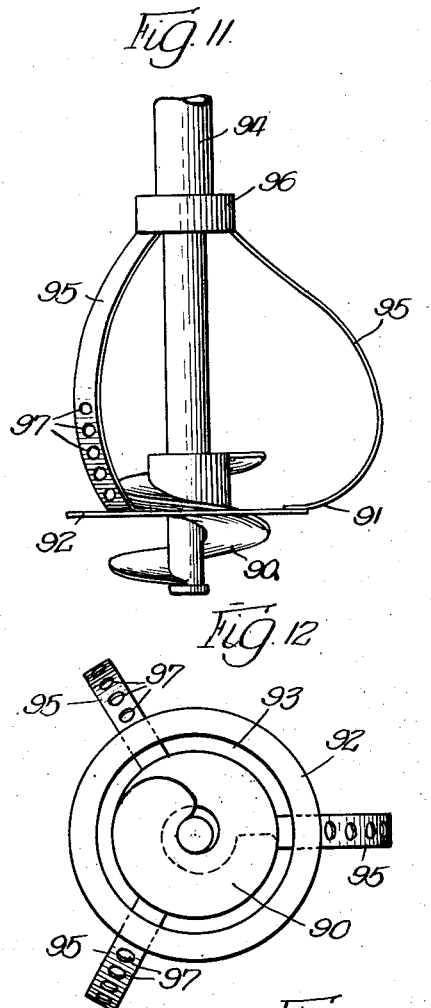
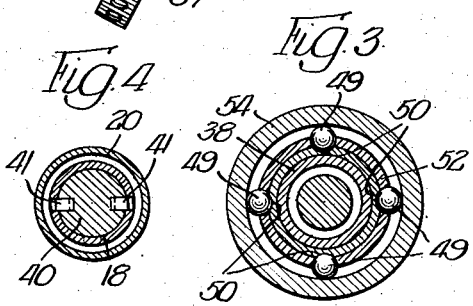
INVENTOR.
Stephen Misic,
BY
Cromwell, Greist & Warden
ATTYS.

Patented Oct. 10, 1950

2,525,421

UNITED STATES PATENT OFFICE 2,525,421

FOOD MIXER

Stephen Misic, Berwyn, Ill., assignor to Franklin Appliance Company, Chicago, Ill., a corporation of Illinois Application February 17, 1947, Serial No. 729,113

10 Claims. (Cl. 259—134)

This invention relates generally to apparatus for mixing materials and is particularly concerned with improvements in the construction of domestic food mixers.

It is an object of the invention to provide, in a food mixer, a beater construction which will thoroughly and quickly mix fluids of varying viscosities or fluids and solids of varying densities and physical properties; which will efficiently break up solid lumps in material being mixed; which will perform the mixing operation without raising the level of the material in the mixing vessel excessively; which will satisfactorily mix either a small amount or a relatively large amount of material in the mixing vessel; and which operates without undesirable splattering.

It is a further object of the invention to provide, in a food mixer, a beater construction comprising oppositely rotating concentrically arranged shafts having beater elements on the ends thereof which cooperate to thoroughly mix or agitate all material in the mixing container while pulling the material towards the middle of the mixing area and which perform the mixing operation at a relatively low level whereby the material is prevented from crawling up the side of the mixing container to any substantial distance above its normal level.

It is a more specific object of the invention to provide oppositely rotating concentrically arranged shaft mounted beater elements, the inner element having a screw-like member which draws the material inwardly and lifts it upwardly, the outer element having a member provided with a plurality of downwardly extending curved tines which cooperate with the screw member to break up solid lumps in the material and to thoroughly and quickly mix the material in a highly satisfactory manner.

It is another object of the invention to provide in a beater construction, comprising concentrically arranged beater shafts and cooperating beater elements, a disk-like portion on the outer beater element by means of which the material on the upper sides of the bowl may be collected and more efficiently forced down into the mixing area and by means of which splattering is effectively prevented.

It is another object of the invention to provide in a beater construction having concentrically arranged oppositely rotating shafts an inner beater element comprising a screw-like member and an outer beater element comprising a ring member which is supported on the outer beater shaft by a plurality of upwardly and inwardly extending bowed arms.

It is another object of the invention to provide a beater construction having oppositely rotatable beater elements mounted on separable concentric shaft members and improved mechanism for detachably connecting the shaft members to the driving mechanism operated by the mixer motor.

These and other objects will be apparent from a description of the preferred form of the invention and modifications thereof which are shown by way of illustration in the accompanying drawings, wherein:

Fig. 1 is an elevation of a food mixer embodying the principles of the invention;

Fig. 2 is a longitudinal section, to an enlarged scale, of the beater construction and the mechanism which connects the same to the driving mechanism;

Fig. 3 is a section on the line 3—3 of Fig. 2;

Fig. 4 is a section on the line 4—4 of Fig. 2;

Fig. 5 is a detail elevation, to an enlarged scale, of the outer beater member;

Fig. 6 is a bottom view of the outer beater member;

Fig. 7 is a detail of the lower end portion of the outer beater shaft, showing a modified form of beater member;

Fig. 8 is a bottom view of the beater member shown in Fig. 7;

Fig. 9 is a detail view of the lower end portion of the outer beater shaft, showing a further modified form of outer beater member;

Fig. 10 is a bottom view of the outer beater member shown in Fig. 9;

Fig. 11 is a detail of the lower end portion of the beater construction, showing a further modified form of the invention; and Fig. 12 is a bottom view of the beater construction shown in Fig. 11.

Referring to Figs. 1 to 6 inclusive of the drawings, the food mixer illustrated comprises a body portion or housing 10 in which a conventional driving motor is enclosed and the improved beater construction 11. The housing 10 is provided with a socket 12 for reception of the plug 13 attached to the cord 14 which is adapted to connect the motor with a source of current. A switch or speed control mechanism is incorporated in the housing and operated by a pivotal arm 15. A handle 16 is provided for detachable connection with the upper portion of the housing 10. The mixer is particularly designed for portable use and is carried or manipulated by grasping the handle 16.

The beater construction 11 comprises an inner beater 17 secured to the lower end of the hollow inner shaft 18 and an outer beater 19 attached to the lower end of the hollow outer shaft 20. The shafts 18 and 20 are concentrically arranged and are detachably connected to a motor operated driving mechanism by connecting structure which will be described. The shafts 18 and 20 when driven by the motor rotate in opposite directions.

The inner beater 17 consists of a screw arrangement characterized by a laterally extending continuous helical rib or flight 21 preferably having a slight outward taper. The rib 21 is secured to a body or shank portion 22 which is characterized by a gradually reduced cross section terminating at the lower end or tip in a button or rounded portion 23 which is adapted to engage with a minimum of friction the bottom of the mixing vessel. The beater member 17 is secured to the shaft 18 by means of a reduced shank portion 24 which extends into the end of the shaft.

The outer beater 19 is characterized by a circular plate or supporting portion 25 having a central aperture 26 for receiving the inner beater shaft 18 and a plurality of integrally formed peripheral tines 27.

The tines 27 are relatively narrow radially outwardly extending members characterized by a downwardly curved portion 28 and a reversely bent end which forms a bottom bight portion 29 and an upwardly directed substantially vertical terminal portion 30. The portion 29 of the tines terminates some distance below the central plate 25 and outwardly of the normal periphery thereof. The general configuration of the tines 27 is U-shaped with the outer leg 27 extending in an arc over the top thereof and integrally joined to the outer edge of the plate 25 as described.

Each tine 27 is provided with a vertically extending slot 31 intermediate the sides. The slot 31 extends from the plate 25 to a point adjacent the end of the portion 30 and separates the tine into portions 32 and 33. The plate 25 and tines 27 are preferably stamped from an integral sheet, the material being cut away between the tines 27 and the latter being then bent or curved to the desired configuration.

The plate 25 is secured to the end of the shaft 20 by means of a connecting ring 34. An inner bearing 35 is preferably provided in the end of the shaft 20 for the shaft 18 which extends therethrough.

The length of the shafts 18 and 20 is such that in the operating position of the beater members the top or terminal edge 36 of the flight 21 on the beater 17 is axially spaced some distance below the plate 25 on the beater member 19. The lower surfaces of the bight portions 29 of the beater tines 27 rotate in a transverse plane extending approximately through the center of the inner beater member 17.

Concentrically arranged inner and outer shafts 37 and 38, respectively (Fig. 2), project from the lower end of the casing 10 and are driven in opposite directions by suitable connections with the shaft of the driving motor. The inner shaft 37 and the beater shaft 18 are provided with cooperating separable connecting structure which includes a spring member 39 mounted in the end 40 of the shaft 37 and having bowed portions 41 which engage in axial slots 42 provided in the hollow end 43 of the shaft 18. The end 40 of shaft 37 is provided with axially extending oppositely disposed slots or recesses 44 and a transverse hole 45. The spring member 39 is generally U-shaped in form and is positioned on the end of the shaft 37 with its legs 46 extending inwardly in an axial direction along the shaft and in the slots 44 providing the outwardly bulged or bowed portions 41 for reception in the slots 42. The spring member 39 may be readily installed on the shaft 37 by passing one leg 46 through the hole 45 and forcing into the hole 45 the bight portion 47 after which the spring member 39 may be rotated about the bight portion 47 to bring the legs 46 into the slots 42.

The inner shaft 37 is separated from the outer shaft 38 by a bearing sleeve 48 secured to one of the shafts and rotatable relative to the other. Preferably the bearing 48 extends beyond the end of shaft 38 slightly and is provided with an abutment shoulder which limits the axial movement of the end 43 of the beater shaft 18.

The outer shaft 38 and the outer beater shaft 20 are provided with cooperating separable connecting structure which comprises a plurality of spring controlled steel balls 49 adjacent the end of the outer shaft 38 and indentations or sockets 50 on the outer surface adjacent the end 51 of the beater shaft 20.

The outer shaft 38 is provided adjacent its end with a reduced portion which is adapted to receive the end 51 of the outer beater shaft 20. A sleeve 52 is secured on a somewhat enlarged portion of the shaft 38 and is provided adjacent its outer edge with a plurality of apertures 53 which form seats for the steel balls 49. The sleeve member 52 forms with the reduced end of the shaft 38 a socket for reception of the end 51 of the beater shaft 20.

The steel balls 49 are held in position by a movable sleeve or ring member 54 having a cam surface 55 for engagement with the balls 49 at its outer end and provided adjacent its inner end with an enlarged bore 56 to accommodate a spring 57. The spring 57 abuts at one end the shoulder 58 in the sleeve 54 and at the other end the shoulder 59 on the shaft member 38 and surrounds the inner end of sleeve 52. Sufficient clearance is allowed between the end 60 of the ring member 54 and the abutment face 61 on the end of the casing 10 to permit retraction of the sleeve 54 axially of the shaft 38 to allow for outward movement of the balls 49. With this construction the outer beater shaft 20 may be removed and replaced in driving relation with the driven shaft 38 even while the motor is operating and the shaft 38 is rotating at a substantial speed.

The connecting structure between the beater shafts 18 and 20 and the driving shafts 37 and 38 provides a positive connection between the shaft members and results in a highly satisfactory operation of the beater shafts at all speeds. There is no appreciable whipping or vibration of either of the beater shafts 18 or 20. With this construction the bearing member 35 (Fig. 2) may be eliminated and the shafts will still operate in a satisfactory manner.

A modified form of outer beater construction is illustrated in Figs. 7 and 8. The beater 70 is provided with an apertured central plate 71 and integrally formed peripherally extending tines 72. The tines 72 are of the same generally U-shaped or curved configuration as the tines 27 of the beater 19. The plate 71 may be attached to the shaft 73 in the same manner as the plate 25 is attached to the shaft 18. The tines 72 are each provided with a pair of spaced slots 74 which extend from adjacent the edge of the plate 71 to adjacent the edge of the tines and divide the tines 72 into three finger-like portions 75, 76 and 77.

A further modified form of outer beater construction is illustrated in Figs. 9 and 10. The beater 80 comprises an apertured central plate 81 and integrally formed peripherally extending tines 82 which have the same configuration as tines 27 of beater 19 but which are not provided with vertical slots. A circular plate or disk 83 preferably having a slightly curved section is positioned in superposed relation on the plate 81. Both the plate 81 and the disk 83 may be secured to the beater shaft 84 in the same manner as plate 25 in Fig. 2. The diameter of the disk 83 is substantially the same as the diameter of the outermost surfaces of the tines 82. The disk 83 is useful in picking up material from the sides of the mixing vessel and removing it to the center of the vessel. The disk 83 is preferably provided as a separate element and may be used with the outer beater constructions shown in Figs. 1 to 8. It also effectively prevents any splattering.

A still further modified form of beater construction is illustrated in Figs. 11 and 12. The screw-like inner beater 90 is the same construction as the beater 17 illustrated in Fig. 2. The outer beater 91 comprises a flat plate or ring member 92 having a central aperture 93 which is positioned around the inner beater 90. The plate 92 is connected to or supported from the outer shaft 94 by a plurality of arms 95. The arms 95 extend outwardly and upwardly and then inwardly in bowed or curved configuration as shown in Fig. 11 and connect the outer periphery of the plate 92 with the attaching collar 96 on the outer beater shaft 94. The arms 95 are provided with a plurality of small apertures 97 for better aeration. The plate 92 is positioned in a plane extending substantially transversely of the axis of the beater 90 and approximately halfway between the axial ends of the beater 90 when the members are in operative relation and connected to the driving mechanism.

In all forms of the beater construction which are illustrative of the invention the inner beater draws the material inwardly and lifts it upwardly, overcoming the centrifugal force caused by its rotation and in effect utilizing a component of the centrifugal force to assist in lifting the material above the bottom of the mixing vessel. The outer beater which rotates in the opposite direction effectively breaks up and aerates the material as it is lifted up by the screw-like beater, producing a mixing operation which is highly satisfactory for many different kinds of materials of varying viscosities.

While specific details of construction and materials have been referred to in illustrating the invention, it will be understood that other details of construction and materials may be resorted to within the spirit of the invention.

I claim:

1. A beater construction for a food mixer or the like comprising an inner beater rotatable in one direction, an upwardly spiraled rib member on said inner beater, and means partially surrounding said inner beater and rotatable in the opposite direction for controlling the movement of the material being mixed, said means comprising circumferentially spaced downwardly directed finger-like elements extending for a portion only of the depth of said rib member in proximity to the outer periphery of said rib member, said finger-like elements having reversely bent end portions terminating adjacent the upper extremity of said spiraled rib member.

2. In a beater construction for a food mixer or the like having concentrically arranged oppositely rotatable shafts, a screw-like agitator member secured on the end of the inner shaft, and a plate-like agitator member secured on the end of the outer shaft, said plate-like member having a plurality of circumferentially spaced downwardly directed tines, said tines and said screw-like agitator member being arranged in concentric relation and said tines being provided with vertical slots.

3. In a beater construction for a food mixer or the like having concentrically arranged oppositely rotatable shafts, a screw-like agitator member secured on the end of the inner shaft, an apertured circular plate on the outer shaft spaced above said screw member, integrally formed tines projecting downwardly from the outer periphery of said circular plate and rotating in a path in outwardly spaced relation to the outer periphery of said screw-like member, said tines comprising outwardly and downwardly extending portions, a bottom curved portion, and an inwardly positioned upwardly extending substantially straight free end portion which terminates short of said plate.

4. A beater construction for a food mixer or the like, comprising an inner beater element rotatable in one direction, a spirally arranged laterally projecting rib member on said inner beater element for lifting the material being mixed from the bottom of the mixing bowl, and means surrounding said inner beater element and rotatable in the opposite direction for controlling the movement of material being mixed, said means comprising a circular plate spaced above the inner beater element with its periphery extending beyond the outer periphery of said rib member, and a plurality of circumferentially spaced downwardly extending peripheral tines encompassing said rib member and having upwardly and inwardly curved end portions spaced outwardly of the periphery of said rib member.

5. In a beater construction as claimed in claim 2, a disk secured in superimposed relation above said plate-like member and having its periphery spaced above said tines.

6. In a beater construction as claimed in claim 2, each of said tines being provided with a plurality of circumferentially spaced vertical slots.

7. A beater construction for a food mixer, comprising concentrically arranged rotatable members adapted to be driven in opposite directions, a cage-like beater element secured to the end of the outer one of said rotatable members comprising a flat circular plate and a plurality of outwardly bowed arms connecting said circular plate to the end of the outer rotatable member, and a screw-like beater element secured to the end of the inner one of said rotatable members and arranged in concentric relation to said circular plate, said cage-like beater element having spaced apertures in the bowed arms thereof.

8. In a mixer, two concentrically arranged shafts, means located at the upper ends of said shafts for rotating the same in opposite directions, a screw-like mixing member on the lower end of the inner shaft arranged to lift the material in which the screw is submerged, and a mixing member on the lower end of the outer shaft comprising a flat ring-like member, vertically extending finger members encompassing a portion of said screw member for modifying the action of the screw on the material and a disk member superposed on said flat ring-like member and having its periphery substantially coextensive with said finger members.

9. In a mixer, two concentrically arranged shafts, means located at the upper ends of said shafts for rotating the same in opposite directions, a mixing screw on the lower end of the inner shaft having a spiraled rib arranged to lift the material in which the screw is submerged, and means on the lower end of the outer shaft comprising a plurality of fingers projecting downwardly for a portion only of the depth of said spiraled rib and rotating in a path around the screw for modifying the action of the screw on the material, said means on the lower end of the outer shaft comprising a disk of substantially the same diameter as the outer periphery of said downwardly projecting fingers.

10. In a mixer, two concentrically arranged shafts, means located at the upper ends of said shafts for rotating the same in opposite directions, a screw-like mixing member on the lower end of the inner shaft arranged to lift the material in which the screw is submerged, and a mixing member on the lower end of the outer shaft, said last mentioned mixing member comprising a flat ring-like member, and finger members extending downwardly therefrom, said finger members encompassing a portion only of said screw-like member for modifying the action of the screw-like member on the material, said finger members having inwardly bent end portions rotating in a path spaced outwardly relative to the outer periphery of said screw-like member.

STEPHEN MISIC.

REFERENCES CITED

The following references are of record in the file of this patent:

UNITED STATES PATENTS

| Number | Name | Date |
| --- | --- | --- |
| 154,263 | Mackey | Aug. 18, 1874 |
| 424,108 | Hallan | Mar. 25, 1890 |
| 835,126 | Wilson | Nov. 6, 1906 |
| 1,155,907 | Frame | Oct. 5, 1915 |
| 1,569,049 | Stufflebeam | Jan. 12, 1926 |
| 1,718,989 | Sydney | July 2, 1929 |
| 2,192,844 | Bean | Mar. 5, 1940 |
| 2,267,807 | Purdy | Dec. 30, 1941 |

FOREIGN PATENTS

| Number | Country | Date |
| --- | --- | --- |
| 607,830 | France | Dec. 19, 1925 |